United States Patent [19]

Kanazawa et al.

[11] Patent Number: 5,226,499
[45] Date of Patent: Jul. 13, 1993

[54] FRONT AND REAR WHEEL TURNING SYSTEM FOR VEHICLE

[75] Inventors: Hirotaka Kanazawa; Hiroshi Ohmura, both of Hiroshima, Japan

[73] Assignee: Mazda Motor Corporation, Hiroshima, Japan

[21] Appl. No.: 819,632

[22] Filed: Jan. 10, 1992

Related U.S. Application Data

[63] Continuation of Ser. No. 485,538, Feb. 27, 1990, abandoned.

[30] Foreign Application Priority Data

Feb. 28, 1989 [JP] Japan .................. 1-49434

[51] Int. Cl.⁵ .............................................. B62D 7/00
[52] U.S. Cl. ................................ 180/79.1; 180/140; 180/142; 280/91
[58] Field of Search .................. 180/79.1, 140, 141, 180/142; 280/91

[56] References Cited

U.S. PATENT DOCUMENTS

| | | | |
|---|---|---|---|
| 4,601,357 | 7/1986 | Miyoshi et al. | 180/140 |
| 4,657,102 | 4/1987 | Kanazawa et al. | 280/91 |
| 4,660,844 | 4/1987 | Yamamoto et al. | 280/91 |
| 4,673,189 | 6/1987 | Kanazawa et al. | 280/91 |
| 4,687,216 | 8/1987 | Kawamoto et al. | 280/91 |
| 4,719,981 | 1/1988 | Miyoshi | 180/140 |
| 4,720,790 | 1/1988 | Miki et al. | 180/140 |
| 4,805,939 | 2/1989 | Kanazawa et al. | 180/140 |
| 4,865,146 | 9/1989 | Ohe | 180/79.1 |
| 4,874,054 | 10/1989 | Watanabe | 180/140 |
| 4,880,072 | 11/1989 | Sakamoto et al. | 180/140 |
| 4,972,916 | 11/1990 | Miller | 180/140 |
| 4,979,115 | 12/1990 | Takahashi | 180/140 |
| 5,018,594 | 5/1991 | Takahashi et al. | 180/140 |
| 5,020,617 | 6/1991 | Oshita et al. | 180/79.1 |

*Primary Examiner*—Mitchell J. Hill
*Attorney, Agent, or Firm*—Sixbey, Friedman, Leedom & Ferguson

[57] ABSTRACT

A four-wheel steering system includes a front wheel turning mechanism which turns the front wheels in response to the turning of the steering wheel, a rear wheel turning mechanism which turns the rear wheels in response to the turning of the steering wheel, and a power steering mechanism. The rear wheel turning mechanism changes the rear wheel turning angle ratio, which is the ratio of the rear wheel turning angle to the front wheel turning angle on the basis of predetermined rear wheel turning angle ratio characteristic curve. A selecting switch selects one of a plurality of rear wheel turning angle ratio characteristic curves according to the running condition of the vehicle and causes the rear wheel turning mechanism to change the rear wheel turning angle ratio on the basis of the rear wheel turning angle ratio characteristic curve selected. The assisting force of the power steering mechanism is changed according to the rear wheel turning angle ratio characteristic curve selected by the selecting switch.

8 Claims, 5 Drawing Sheets

F I G. 7
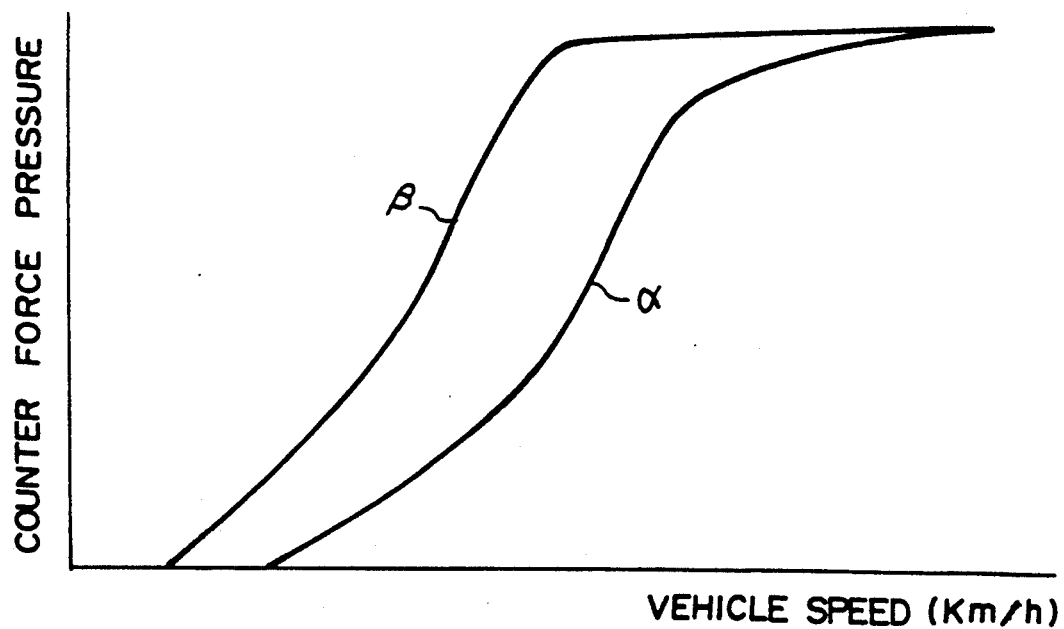

FRONT AND REAR WHEEL TURNING SYSTEM FOR VEHICLE

This application is a Continuation of Ser. No. 07/485,538, filed Feb. 27, 1990, now abandoned.

BACKGROUND OF THE INVENTION

1. Field of the Invention

This invention relates to a front and rear wheel turning system for a vehicle in which both the front and rear wheels turn in response to the turning of the steering wheel, and more particularly to such a front and rear wheel turning system which is provided with a power steering mechanism for assisting the driver in turning the steering wheel.

2. Description of the Prior Art

As disclosed in, for instance, U.S. Pat. No. 4,601,357, there has been known a four-wheel steering system in which both the front and rear wheels turn in response to turning of the steering wheel, the rear wheel turning angle ratio, which is the ratio of the rear wheel turning angle to the front wheel turning angle, being changed on the basis of a predetermined rear wheel turning angle ratio characteristic curve. Generally, the rear wheels turn in the direction opposite to the front wheels (the reverse phase) when the vehicle speed is low, which provides a better heading performance, and turn in the same direction as the front wheels (the same phase) when the vehicle speed is high, which improves the running stability of the vehicle. Further, it has been proposed to prepare a plurality of rear wheel turning angle ratio characteristic curves and select one of them according to the running condition of the vehicle. (See U.S. Pat. No. 4,660,844, for instance.)

Some of such four-wheel steering systems are provided with a power steering mechanism which assists the driver in turning the steering wheel.

In the four-wheel steering system having a power steering mechanism, it is preferred that the power steering mechanism be controlled with relation to the rear wheel turning angle ratio characteristic curve since the rear wheel turning angle ratio characteristic curve can affect the steering characteristics of the steering system.

SUMMARY OF THE INVENTION

In view of the foregoing observations and description, the primary object of the present invention is to provide a front and rear wheel turning system which has a front wheel turning mechanism, a rear wheel turning mechanism and a power steering mechanism and in which the power steering mechanism can be controlled according to the rear wheel turning angle ratio characteristic curve so that the assisting force of the power steering mechanism matches the rear wheel turning angle ratio characteristic curve and an optimal control of the vehicle can be obtained.

In accordance with one aspect of the present invention, there is provided a front and rear wheel turning system comprising a front wheel turning mechanism which turns a front wheel or front wheels in response to the turning of a steering wheel, a rear wheel turning mechanism which turns a rear wheel or rear wheels in response to the turning of the steering wheel, and a power steering mechanism, the rear wheel turning angle ratio which is the ratio of the rear wheel turning angle to the front wheel turning angle being changed on the basis of predetermined rear wheel turning angle ratio characteristic curve, characterized by having a selecting means which selects one of a plurality of rear wheel turning angle ratio characteristic curves according to the running condition of the vehicle and causes the rear wheel turning mechanism to change the rear wheel turning angle ratio on the basis of the rear wheel turning angle ratio characteristic curve selected, and an assisting force changing means which changes the assisting force of the power steering mechanism according to the rear wheel turning angle ratio characteristic curve selected by the selecting means.

Though the present invention is normally applied to a vehicle having a pair of front wheels and a pair of rear wheels, it can also be applied to vehicles having only one front wheel and two or more rear wheels, having two or more front wheels and only one rear wheels, and having more than two front wheels and rear wheels. Accordingly, in this specification, the term "front wheel turning mechanism" should be interpreted as designating a mechanism which turns the front wheel(s) in response to the turning of the steering wheel. Similarly, the term "rear wheel turning mechanism" should be interpreted as designating a mechanism which turns the rear wheel(s) in response to the turning of the steering wheel. Further, the term "rear wheel turning angle ratio" designates the ratio of the turning angle of the rear wheel(s) to the turning angle of the front wheel(s).

For example, a rear wheel turning angle ratio characteristic curve which is suitable for the normal running condition and a rear wheel turning angle ratio characteristic curve which is suitable for a severe running condition are included in said plurality of rear wheel turning angle ratio characteristic curves, and when the rear wheel turning angle ratio characteristic curve which is suitable for the severe running condition is selected, the assisting force changing means reduces the assisting force of the power steering mechanism. When the rear wheel turning angle ratio characteristic curve suitable for the severe running condition is selected in order to run, for instance, off-road, and the assisting force of the power steering mechanism is reduced, the force required to turn the steering wheel is increased and the driver is prevented from excessively turning the steering wheel.

Further, a first rear wheel turning angle ratio characteristic curve which is suitable for the normal running condition and a second rear wheel turning angle ratio characteristic curve in which importance is attached to the steering performance are included in said plurality of rear wheel turning angle ratio characteristic curves, and when the rear wheel turning angle ratio characteristic curve in which importance is attached to the steering performance is selected, the assisting force changing means increases the assisting force of the power steering mechanism. When the rear wheel turning angle ratio characteristic curve in which importance is attached to the steering performance is selected in order to run, for instance, narrow paths, and the assisting force of the power steering mechanism is increased, the force required to turn the steering wheel is reduced and the driver can easily steer the vehicle.

BRIEF DESCRIPTION OF THE DRAWINGS

FIG. 7 shows an example of the first and second counterforce characteristic curves.

DESCRIPTION OF THE PREFERRED EMBODIMENT

Figure 1:
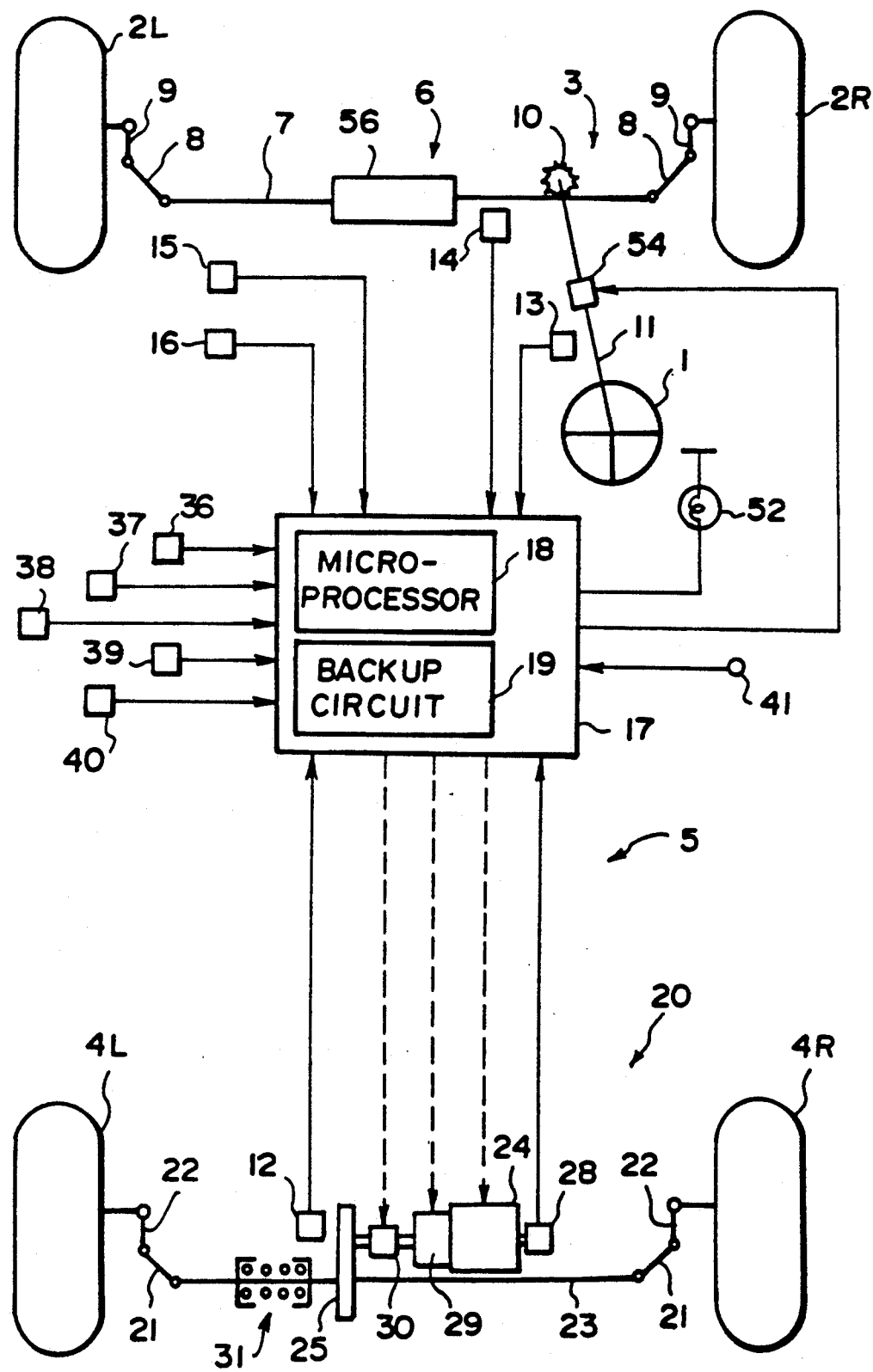
FIG. 1 is a schematic view showing a vehicle provided with a four-wheel steering system in accordance with an embodiment of the present invention.

In FIG. 1, a vehicle provided with a four-wheel steering system in accordance with an embodiment of the present invention comprises a front wheel turning mechanism 3 which turns front wheels 2L and 2R in response to the turning of a steering wheel 1, a rear wheel turning mechanism 5 which turns rear wheels 4L and 4R in response to the turning of the front wheels 2L and 2R, and a power steering mechanism 6 which is associated with the front wheel turning mechanism 3 and assists the driver in turning the steering wheel 1.

The front wheel turning mechanism 3 comprises a front wheel turning rod 7 which extends in the transverse direction of the vehicle body and is provided with a rack which is in mesh with a pinion 10 on the lower end of a steering shaft 11, left and right tie rods 8 connected on opposite ends of the front wheel turning rod 7, and left and right knuckle arms 9 connected between the tie rods 8 and the front wheels 2L and 2R. The front wheel turning rod 7 is slid left and right in response to the turning of the steering wheel 1, whereby the front wheels 2L and 2R are turned.

The rear wheel turning mechanism 5 comprises a control portion and a mechanical portion 20. The control portion includes a rear wheel turning angle sensor 12, a steering wheel turning angle sensor 13, a front wheel turning angle sensor 14, a pair of vehicle speed sensors 15 and 16, and a control unit 17. The control unit 17 comprises micro processor 18 and a back-up circuit 19. The mechanical portion 20 comprises a rear wheel turning rod 23 which is connected to one of the rear wheels 4L and 4R at each end by way of a tie rod 21 and a knuckle arm 22, a servo motor 24 and a reduction gear mechanism 25 which transmits the driving force of the servo motor 24 to the rear wheel turning rod 23.

Figure 2:
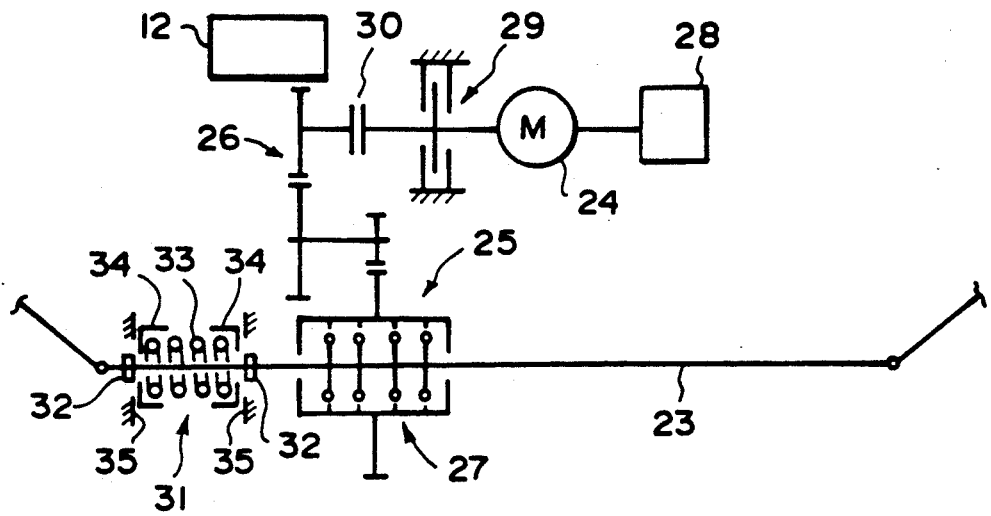
FIG. 2 is a fragmentary schematic view for illustrating the rear wheel turning mechanism.

The servo motor 24 is a stepping motor whose output shaft is connected to the rear wheel turning rod 23 by way of the reduction gear mechanism 25, which comprises a gear train 26 and a ball screw 27 as shown in FIG. 2. The servo motor 24 rotates under the control of the control signal output from the control unit 17, and turns rear wheels 4L and 4R. The turning angle of the rear wheels 4L and 4R is calculated on the basis of a detecting signal which is output from the rear wheel turning angle sensor 12 which detects the working amount of the reduction gear mechanism 25 and a detecting signal which is output from the rotary encoder 28 which detects the rotating angle of the servo motor 24. The turning angle of the rear wheels 4L and 4R thus calculated is fed back to the control unit 17 and the control unit 17 uses the feedback signal in its control of the operation of the mechanical portion 20 of the rear wheel turning mechanism 5. A brake 29 is interposed between the servo motor 24 and the reduction gear mechanism 25, and when the rear wheels 4L and 4R are held in a given angular position, the brake 20 prevents the driving force of the servo motor 24 from being transmitted to the reduction gear mechanism 25.

Further, a clutch 30 is interposed between the servo motor 24 and the reduction gear mechanism 25. A rear wheel neutralizing means 31 is provided on the rear wheel turning rod 23 and returns the rear wheels 4L and 4R to the straight-ahead position when the clutch 30 is disengaged. The rear wheel neutralizing means 31 comprises a pair of holders 32 fixed to the rear wheel turning rod 23 a predetermined distance from each other, a centering spring 33 disposed between the holders 33, a pair of retainers 34 mounted on opposite sides of the centering spring 33, and a pair of stoppers 35 fixed to the vehicle body on opposite sides of the spring 33. When the rear wheels 4L and 4R are in the straight-ahead position, the retainers 34 abuts against the respective stopper 35, and when the rear wheel turning rod 23 slides left or right, one of retainers 34 moves away from the corresponding stopper 35 while compressing the centering spring 33 so that the spring 33 urges the rear wheel turning rod 23 toward the neutral position (in which the rear wheels 4L and 4R are held in the straight-ahead position).

The control unit 17 reads out the rear wheel turning angle ratio, i.e., the ratio of the rear wheel turning angle to the front wheel turning angle, which is based on the present vehicle speed and a preset rear wheel turning angle ratio characteristic curve and outputs a control signal to the servo motor 24. That is, the control unit 17 detects the turning angle of the front wheels 2L and 2R and the present vehicle speed from the detecting signal output from the steering wheel turning angle sensor 13, which detects the turning angle of the steering wheel 1 and the detecting signal output from the vehicle speed sensor 15, which detects the rotating speed of the front wheels 2L and 2R. Then the control unit 17 reads out a target turning angle for the rear wheels 4L and 4R based on these values and the preset rear wheel turning angle ratio characteristic curve, and outputs a control signal corresponding to the target turning angle of the rear wheels 4L and 4R to the servo motor 24. At the same time, the control unit 17 constantly follows the position of the servo motor 24 by means of the signal from the rotary encoder 28, thereby effecting control of the turning angle of the rear wheels 4L and 4R.

Figure 3:
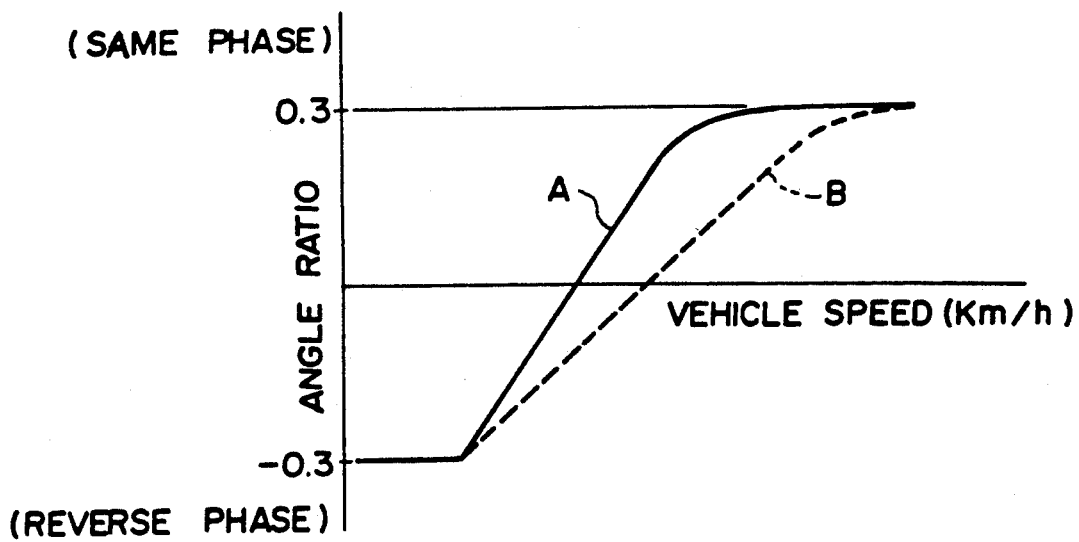
FIG. 3 is a view showing the rear wheel turning angle ratio characteristic curves.

The rear wheel turning angle ratio characteristic curve which conforms to normal running conditions for the vehicle is shown by solid line A in FIG. 3; this curve is designated as the first rear wheel turning angle characteristic curve. A second rear wheel turning angle characteristic curve (shown by broken line B in FIG. 3) conforms to a particular set of running conditions for the vehicle. In the first rear wheel turning angle ratio characteristic curve, the rear wheel turning angle ratio is negative (i.e., the rear wheels 4L and 4R are turned in the direction opposite to the front wheels 2L and 2R) when the vehicle speed is low, which improves the heading performance of the vehicle; and the rear wheel turning angle ratio becomes positive (i.e., the rear wheels 4L and 4R are turned in the same direction as the front wheels 2L and 2R) as the vehicle speed increases, which improves the running stability at high speed. In the second rear wheel turning angle ratio characteristic curve, the rate of increase of the rear wheel turning angle ratio with the vehicle speed is smaller than that in the first rear wheel turning angle ratio characteristic curve and the rear wheel turning angle ratio reaches zero at a higher vehicle speed than in the first rear wheel turning angle ratio characteristic curve so that the heading performance at low speed is further improved. The rear wheel turning angle ratio characteristic curves are changed from one to the other by manually operating a selecting switch 36 or by automatically operating the selecting switch 36 according to the running condition of the vehicle.

Each of the means for detecting the operating conditions of the vehicle for controlling the rear wheel turning mechanism 5 is of a double-structure for the purpose of making them fail-safe. That is, as shown in FIG. 1, the front wheel turning angle sensor 14, which detects the turning angle of the front wheels 2L and 2R through the displacement of the front wheel turning rod 7, is provided in addition to the steering wheel turning angle sensor 13, the vehicle speed sensor 16, which detects the vehicle speed through the rotating speed of the crankshaft, is provided in addition to the vehicle speed sensor 15, and the rear wheel turning angle sensor 12, which detects the turning angle of the rear wheels 4L and 4R through the working amount of the reduction gear mechanism 25, is provided in addition to the rotary encoder 28. For example, when the turning angle of the front wheels 2L and 2R indicated by the detecting signal from the steering wheel turning angle sensor 13 largely differs from that indicated by the detecting signal from the front wheel turning angle sensor 12, it is determined that one of the sensors has failed and predetermined measures are taken, e.g., the rear wheels 4L and 4R are returned to the straight-ahead position.

Figure 4:
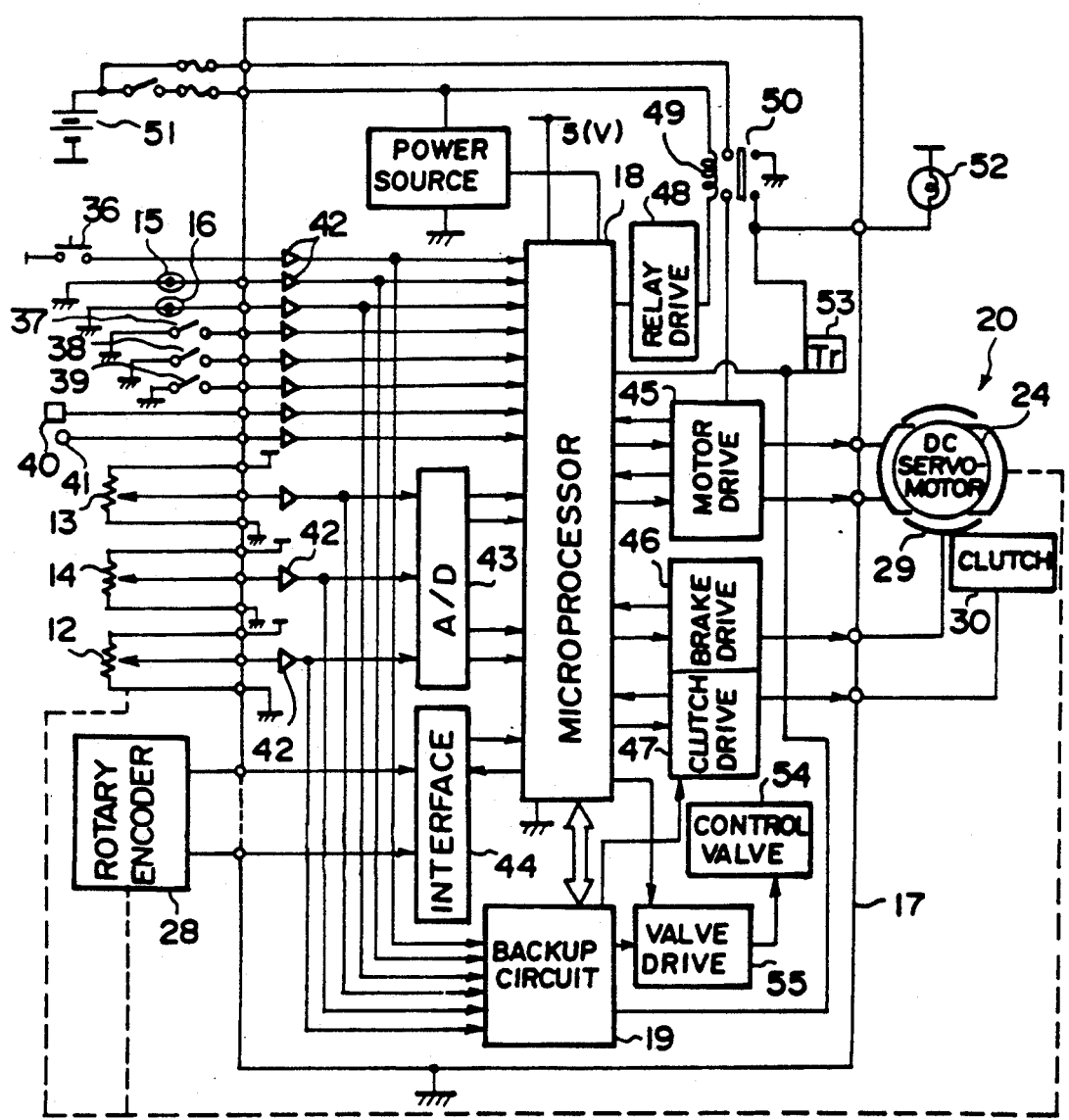
FIG. 4 is a block diagram showing the control unit.

In FIG. 4, reference numeral 37 denotes a neutral switch which is used when the four-wheel steering system of this embodiment is incorporated in a manual transmission vehicle and which detects that the shift lever is in neutral or the clutch pedal is depressed. Reference numeral 38 denotes an inhibitor switch 38 which is used when the four-wheel steering system of this embodiment is incorporated in an automatic transmission vehicle which detects that the selector lever is in N or P. Reference numeral 39 denotes a brake switch which detects that the brake pedal is depressed. Reference numerals 40 and 41 respectively denote an engine switch which detects that the engine is working and an L-terminal which detects that the alternator is working. The signals which are output from these switches 37 to 40 and the L-terminal 41 are input into the control unit 17. That is, as shown in FIG. 4, the output signals from the vehicle speed sensors 15 and 16, the switches 36 to 40 and the L-terminal 41 are input into the micro processor 18 of the control unit 17 by way of a buffer 42. The output signals from the steering wheel turning angle sensor 13, the front wheel turning angle sensor 14 and the rear wheel turning angle sensor 15 are input into the micro processor 18 by way of the buffer 42 and an A/D converter 43. The output signal from the rotary encoder 28 is input into the micro processor 18 by way of an interface 44.

The control unit 17 starts to operate in response to the output signal from the L-terminal 41, and control signals generated by the micro processor 18 are transmitted to the servo motor 24 by way of a motor control circuit 45, to the brake 29 by way of a brake driving circuit 46 and to the clutch 30 by way of a clutch driving circuit 47.

When the micro processor 18 determines on the basis of the output signals from the various detecting means that some part of the control system has failed, the micro processor 18 outputs control signals which cause a relay driving circuit 48 to de-energize a winding 49 of a relay 50 and cause a clutch driving circuit 47 to disengage the clutch 30. When the winding 49 is de-energized, power supplied from a battery 51 to the motor driving circuit 45 is cut, and an alarm lamp 52 is turned on. Further, when the clutch 30 disengages, the rear wheels 4L and 4R are returned to the straight-ahead position by way of the neutralizing means 31. If the failure is of a type that will not adversely affect the control of the servo motor 24, the micro processor 18 causes current to flow into the base of a transistor 53, thereby putting on the alarm lamp 52, and causes the servo motor 24 to return the rear wheels 4L and 4R to the straight-ahead position.

Said backup circuit 19, which is independent of the micro processor 18, interrupts the operation of the micro processor 18 when the micro processor 18 itself fails. That is, the detecting signals from the sensors 12 to 16 are input into the backup circuit 19, and the backup circuit 19 determines, on the basis of the detecting signals and separately from the micro processor 18, whether the rear wheel turning mechanism 5 is operating correctly according to the running conditions of the vehicle. When it is determined that the rear wheel turning mechanism 5 is not operating correctly, the backup circuit 19 turns on the alarm lamp 52 and outputs a control signal which causes the clutch 30 to disengage, whereby the rear wheels 4L and 4R return to the straight-ahead position under the force of the neutralizing means 31.

Further, the backup circuit 19 outputs a high or low signal to the micro processor 18 and the micro processor 18 outputs to the backup circuit 19 a signal corresponding to the signal the backup circuit 19 outputs. Thus the backup circuit 19 watches the micro processor 18 and if the micro processor 18 fails, the backup circuit 19 outputs to the mechanical portion 20 a control signal which resets the rear wheel turning control which has been made by the micro processor 18.

Further, the backup circuit 19 controls the assisting force of the power steering mechanism 6 according to the operating condition and the speed of the vehicle. That is, the backup circuit 19 outputs a control signal to a valve driving circuit 55 which controls a control valve 54 of the power steering mechanism 6.

Figure 5:
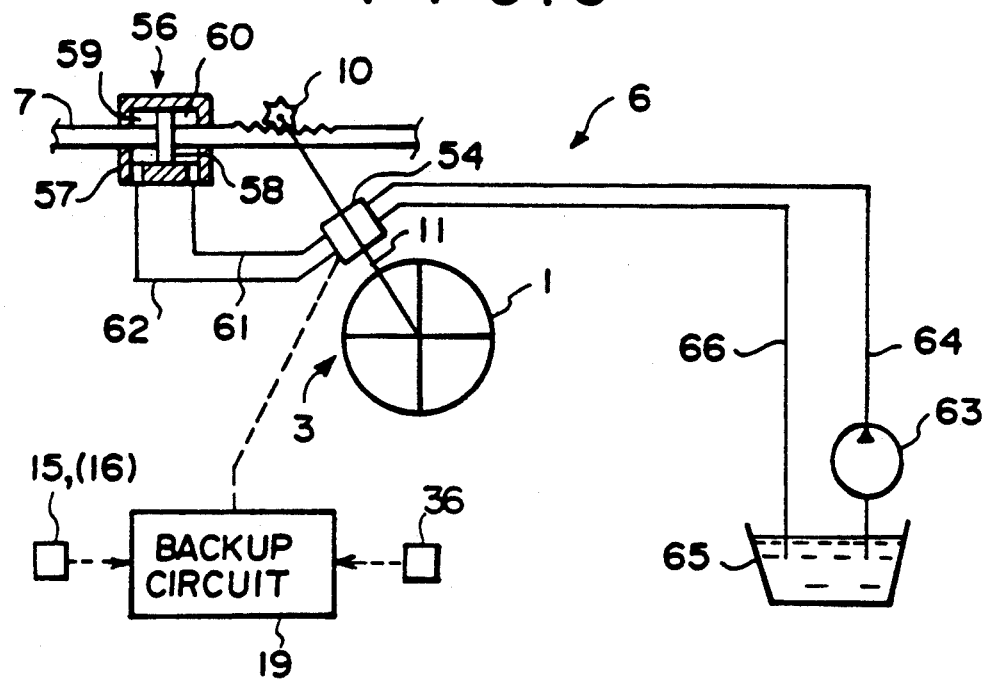
FIG. 5 is a fragmentary schematic view for illustrating the power steering mechanism.

As shown in FIG. 5, the power steering mechanism 6 includes a cylinder mechanism 56 which is mounted on the front wheel turning rod 7. The cylinder mechanism 56 comprises a cylinder 57 and a piston 58 which is formed integrally with the front wheel turning rod 7 and divides the space in the cylinder 57 into left and right hydraulic pressure chambers 59 and 60. The hydraulic pressure chambers 59 and 60 are connected, respectively by way of pipes 61 and 62, to a control valve 54 on the steering shaft 11. A pipe 64 which extends from the discharge side of an oil pump 63 and a pipe 66 which communicates with a reservoir 65 are connected to the control valve 54.

Figure 6:
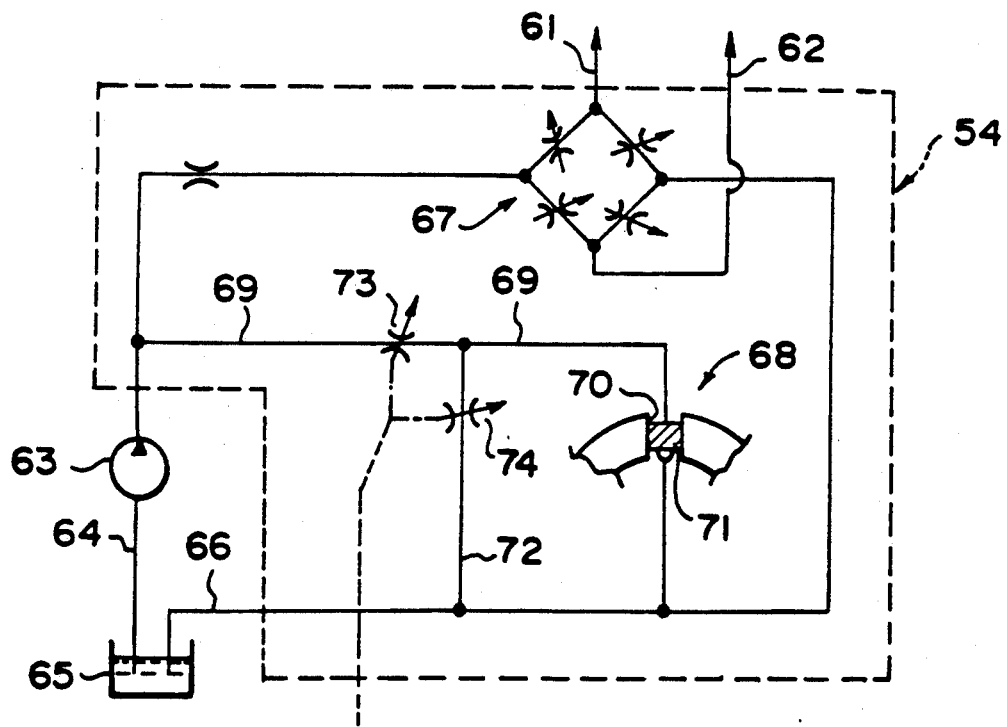
FIG. 6 is a schematic view showing the control valve.

As shown in FIG. 6, the control valve 54 comprises a switching valve 67 and a counterforce mechanism 68. The switching valve 67 determines which of the chambers 59 and 60 the hydraulic oil is to be fed to according to the direction in which the steering wheel 1 is turned. The counterforce mechanism 68 comprises a pressure chamber 70 and a piston 71 which moves under the pressure in the pressure chamber 70. The pressure chamber 70 communicates with a pipe 69 which branches off from the pipe 64. As the pressure in the pressure chamber 70 increases, the restraint force acting on a torsion bar which is connected to the steering wheel 1 increases. That is, as the vehicle speed increase, the assisting force of the power steering mechanism 6 is weakened. The pipe 69 communicates with a relief pipe 66 by way of a branch pipe 72. The pipes 69 and the branch pipe 72 are respectively provided with variable constrictions 73 and 74 which interlock with each other and form a counterforce pressure changing means.

Normally the openings of the variable constrictions 73 and 74 change with the vehicle speed. More particularly, the opening of the construction 73 becomes larger as the vehicle speed increases while the opening of the constriction 74 becomes smaller as the vehicle speed increases. With this arrangement, the pressure in the pressure chamber 70 increases to weaken the assisting force of the power steering mechanism 6 as the vehicle speed increases. That is, the backup circuit 19 determines the value of the counterforce pressure to be produced in the counterforce mechanism 68 on the basis of the preset counterforce characteristic curves and the present vehicle speed which is determined on the basis of the signals from the vehicle speed sensors 15 and 16, and a control signal which corresponds to the value of the counterforce pressure to be produced is output to the variable constrictions 73 and 74 and controls the openings of the constrictions 73 and 74.

There are prepared first and second counterforce characteristic curves which are respectively shown by solid line α and broken line β in FIG. 7. When the assisting force of the power steering mechanism 6 is to be increased, the first counterforce characteristic curve is used and when the assisting force of the power steering mechanism 6 is to be reduced, the second counterforce characteristic curve is used. Assuming that the first rear wheel turning angle ratio characteristic curve is suitable for normal running conditions for the vehicle, and the second rear wheel turning angle ratio characteristic curve is suitable for severe running conditions for the vehicle such as those in running off-road, when the rear wheel turning angle ratio characteristic curves are changed from the first rear wheel turning angle ratio characteristic curve to the second rear wheel turning angle ratio characteristic curve, the backup circuit 19 outputs a control signal which causes the counterforce characteristic curves to change from the first counterforce characteristic curve to the second counterforce characteristic curve and the assisting force of the power steering mechanism 6 is reduced. When the assisting force of the power steering mechanism is reduced, the force required to turn the steering wheel is increased and the driver is prevented from excessively turning the steering wheel.

Assuming that the first rear wheel turning angle ratio characteristic curve is suitable for the normal running conditions and importance is attached to the steering performance in the second rear wheel turning angle ratio characteristic curve, when the rear wheel turning angle ratio characteristic curves are changed from the first rear wheel turning angle ratio characteristic curve to the second rear wheel turning angle ratio characteristic curve, the backup circuit 19 outputs a control signal which causes the counterforce characteristic curves to change from the second counterforce characteristic curve to the first counterforce characteristic curve and the assisting force of the power steering mechanism 6 is increased. When the assisting force of the power steering mechanism is increased, the force required to turn the steering wheel is reduced and the driver can easily steer the vehicle.

The micro processor 18 watches the backup circuit 19 and outputs a control signal which causes the control valve 54 to set the assisting force on the basis of the first counterforce characteristic curve independently from the backup circuit 19 when it is determined that the counterforce characteristic curves are not correctly changed due to a failure in the backup circuit 19.

In the embodiment described above, the backup circuit 19 which watches the micro processor 18 also functions as the assisting force control means. Accordingly, the overall structure is simplified as compared with an arrangement in which the assisting force control means is provided separately from the backup circuit 19.

Means for watching the selecting switch 36 and inhibiting the selecting switch 36 from operating when the selecting fails may be provided in the micro processor 18 or the backup circuit 19 so that the micro processor 18 or the backup circuit 19 selects the first rear wheel turning angle ratio characteristic curve and the first counterforce characteristic curve in response to inhibition of operation of the selecting switch 36.

Further, if the rear wheel turning angle ratio characteristic curves are quickly changed from the first rear wheel turning angle ratio characteristic curve to the second rear wheel turning angle ratio characteristic curve at a high speed, the running stability can be adversely affected. Accordingly, it is preferred that the change of the rear wheel turning angle ratio characteristic curves be gradually effected or be not effected until the vehicle speed becomes lower than a predetermined speed or the steering wheel turning angle becomes smaller than a predetermined value. Further, the control unit 17 may be arranged so that it changes the rear wheel turning angle ratio characteristic curves before it changes the assisting force of the power steering mechanism 6. For example, the control unit 17 first weakens the assisting force and then changes the rear wheel turning angle ratio characteristic curves when the vehicle is in the severe running condition. In this case, since the assisting force has weakened so that a larger force is required to turn the steering wheel before the rear wheel turning angle ratio characteristic curves are changed from the first rear wheel turning angle ratio characteristic curve to the second rear wheel turning angle ratio characteristic curve, the heading performance can be improved while the steering stability is kept.

We claim:

1. A front and rear wheel turning system comprising a front wheel turning mechanism which turns a front wheel or front wheels in response to the turning of a steering mechanism, a rear wheel turning mechanism which turns a rear wheel or rear wheels in response to the turning of the steering wheel, and a power steering mechanism for providing an assisting force to assist turning of the steering wheel, wherein a rear wheel turning angle ratio which is the ratio of the rear wheel turning angle to the front wheel turning angle is changed on the basis of a predetermined rear wheel turning angle ratio characteristic curve, the system comprising:

a selecting means for selecting one of a plurality of rear wheel turning angle ratio characteristic curves according to the running condition of the vehicle and causes the rear wheel turning mechanism to change the rear wheel turning angle ratio characteristic curve selected, and an assisting force changing means for changing the assisting force of the power steering mechanism according to the rear wheel turning angle ratio characteristic curve selected by the selecting means.

2. A front and rear wheel turning system as defined in claim 1, wherein the plurality of rear wheel turning angle ratio characteristic curves include a first rear wheel turning angle ratio characteristic curve which is suitable for the normal running condition and a second rear wheel turning angle ratio characteristic curve which is suitable for a severe running condition, the assisting force changing means including means to reduce the assisting force of the power steering mechanism in response to the selection of said second rear wheel turning angle ratio characteristic curve.

3. A front and rear wheel turning system as defined in claim 2 wherein a first assisting force characteristic curve is provided for determining the assisting force of the power steering mechanism in the normal state of the rear wheel turning mechanism such that the assisting force is reduced as the vehicle speed is increased, wherein according to the first assisting force characteristic curve the assisting force is reduced substantially in proportion to the vehicle speed, and wherein the selection of the rear wheel turning angle ratio characteristic curve which is suitable for the severe running condition causes the assisting force changing means to reduce the assisting force provided by the power steering mechanism with increasing vehicle speed according to a second assisting force characteristic curve, the first and second assisting force characteristic curves being determined so that the assisting force for a given vehicle speed is smaller in the second assisting force characteristic curve than the assisting force for the same speed provided by the first assisting force characteristic curve.

4. A front and rear wheel turning system as defined in claim 1 in which a first rear wheel turning angle ratio characteristic curve is provided which is suitable for the normal running condition and a second rear wheel turning angle ratio characteristic curve is provided wherein steering performance is taken into consideration, said first and second curves being included in said plurality of rear wheel turning angle ratio characteristic curves, and wherein the selection of the second rear wheel turning angle ratio characteristic curve causes the assisting force changing means to increase the assisting force of the power steering mechanism.

5. A front and rear wheel turning system as defined in claim 4 in which said power steering mechanism is arranged so that its assisting force is reduced with increase in the vehicle speed according to a first assisting force characteristic curve in the normal state of the rear wheel turning mechanism, according to the first assting force characteristic curve such that the assisting force is reduced substantially in proportion to the vehicle speed, and wherein the selection of the second rear wheel turning angle ratio characteristic curve causes the assisting force changing means to reduce the assisting force provided by the power steering mechanism with increasing vehicle speed according to a second assisting force characteristic curve, the first and second assisting force characteristic curves being determined so that the assisting force for a given vehicle speed is larger in the second curve than the first curve.

6. A front and rear wheel turning system as defined in claim 5 in which when said selecting means commands the rear wheel turning mechanism, at a high vehicle speed, to change from the first rear wheel turning angle ratio characteristic curve to the second rear wheel turning angle ratio characteristic curve in which importance is attached to the steering performance, the rear wheel turning mechanism does not change from the first characteristic curve to the second characteristic curve until the vehicle speed becomes lower than a predetermined value thereby preventing adverse effects associated with changes in that the characteristic curves occurring at high speeds.

7. A front and rear wheel turning system as defined in claim 5 in which when said selecting means commands the rear wheel turning mechanism, at a high vehicle speed, to change from the first rear wheel turning angle ratio characteristic curve to the second rear wheel turning angle ratio characteristic curve in which importance is attached to the steering performance, wherein the rear wheel turning mechanism does not change from the second characteristic curve to the second characteristic curve until the turning angle of the steering wheel becomes lower than a predetermined value.

8. A four-wheel steering system comprising a front wheel turning mechanism which turns front wheels in response to the turning of a steering wheel, a rear wheel turning mechanism which turns rear wheels in response to the turning of the steering wheel, and a power steering mechanism for providing an assisting force to assist turning of the steering wheel, wherein a rear wheel turning angle ratio which is the ratio of the rear wheel turning angle to the front wheel turning angle is changed on the basis of a predetermined rear wheel turning angle ratio characteristic curve, the system further comprising:

a selecting means for selecting one of a plurality of rear wheel turning angle ratio characteristic curves according to the running condition of the vehicle and causes the rear wheel turning mechanism to change the rear wheel turning angle ratio on the basis of the rear wheel turning angle ratio characteristic curve selected, and an assisting force changing means for changing the assisting force of the power steering mechanism according to the rear wheel turning angle ratio characteristic curve selected by the selecting means.

* * * * *